United States Patent [19]

Shioji

[11] Patent Number: 4,878,739

[45] Date of Patent: Nov. 7, 1989

[54] LIQUID CRYSTAL DISPLAY DEVICE WITH PARTICULAR IMPEDANCE RATIO FOR SIGNAL AND COMMON ELECTRODES

[75] Inventor: Mitsuaki Shioji, Nara, Japan

[73] Assignee: Sharp Kabushiki Kaisha, Osaka, Japan

[21] Appl. No.: 252,266

[22] Filed: Sep. 30, 1988

[30] Foreign Application Priority Data

Dec. 4, 1987 [JP] Japan .............................. 62-307943

[51] Int. Cl.$^4$ .............................................. G02F 1/13
[52] U.S. Cl. .................................................. 350/336
[58] Field of Search ................................ 350/336, 333

[56] References Cited

U.S. PATENT DOCUMENTS 4,384,763  5/1983  Russo .................................. 350/333
4,649,383  3/1987  Takeda et al. ....................... 340/805
4,802,744  2/1989  Shindo et al. ....................... 350/336

Primary Examiner—Stanley D. Miller
Assistant Examiner—Napoleon Thantu
Attorney, Agent, or Firm—Flehr, Hohbach, Test, Albritton & Herbert

[57] ABSTRACT

A liquid crystal display device has mutually crossing groups of electrodes to have a dot matrix electrode structure. The surface resistance of the transparent conductive layers on these electrodes are different, their ratio being $L_2W_1/L_1W_2$, wherein $L_2$, $W_2$, $L_1$ and $W_1$ are the lengths and widths of the mutually crossing groups of electrodes, implying that the impedance between the ends of the mutually crossing electrodes are equal.

1 Claim, 6 Drawing Sheets

FIG.—3

LIQUID CRYSTAL DISPLAY DEVICE WITH PARTICULAR IMPEDANCE RATIO FOR SIGNAL AND COMMON ELECTRODES

BACKGROUND OF THE INVENTION

This invention relates to a liquid crystal display device and more particularly to a liquid crystal display device structured with dot matrix electrodes used for a multi-pixel display such as a large matrix liquid crystal display and a liquid crystal television.

A liquid crystal device is generally comprised of a liquid crystal layer sealed between a pair of transparent substrates (hereinafter referred to as first and second substrates) which sandwich it from opposite sides thereof and are bonded to it by a sealing agent. Each of these transparent substrates has on its surface facing the liquid crystal layer a plurality of belt-like transparent electrodes formed parallel to one another with transparent electroconductive films. The groups of these transparent electrodes on the first and second transparent substrates are so arranged as to cross each other to thereby establish a matrix formation across the aforementioned liquid crystal layer.

Transparent electroconductive layers used as transparent electrodes on the substrates of liquid crystal display devices have been required to be high in transparency and low in resistance. As liquid crystal display panels have become larger and the display pitch finer, it is particularly important to reduce their resistance. In the past, no distinction was made between transparent conductive layers for the first substrate and those for the second substrate and attempts were made to reduce the resistance of both in the same manner.

Necessity of reducing the resistance of the transparent conductive layer is explained next for the case of a large matrix liquid display device as an example. As the number of pixels in a large matrix increases, the electroconductive film patterns of both the first and second electrodes (that is, the electrodes on the first and second substrates, respectively) become finer. This makes the lines thinner and longer, and the linear resistance of transparent conductive layers becomes greater. When such a liquid crystal display is driven at a frequency of f, each pixel thereof gives rise to an impedance given by $R_{pix} + (j\omega C_{pix})^{-1}$ where j is the square root of $-1$, $R_{pix}$ and $C_{pix}$ are surface resistance and capacitance of each pixel and $\omega = 2\pi f$, and there is a potential drop at each pixel. As a result, differences appear in the effective voltage on the liquid crystal at each pixel between the terminal side and the opposite side along the first and second electrode lines. In the case of a larger matrix liquid crystal display, such differences manifest themselves as unevenness in the vertical or horizontal threshold voltage $V_{th}$ and are observed as non-uniform display. Moreover, since the impedance includes frequency f, the threshold voltage $V_{th}$, too, becomes dependent on frequency. Since signals of different frequencies are applied to the individual pixels of a matrix liquid crystal display, depending on the nature of the display, there arise fluctuations in the threshold voltage and non-uniformity in display of characters or patterns if resistance is large to make this dependency on frequency also large.

This is why there have been attempts to reduce the resistance of transparent conductive layers. To this end, one may consider increasing the layer thickness or reducing the degree of oxidation. Both methods, however, are expensive and involve problems such as reduced layer adhesiveness. If the layer thickness is increased to, reduce the surface resistance, for example, the transmittance is adversely affected, the time required for etching becomes longer and the yield becomes lower.

SUMMARY OF THE INVENTION

It is therefore an object of the present invention in view of the above to provide an improved liquid crystal display element such as a large matrix liquid crystal display regarding unevenness in the threshold voltage $V_{th}$ in vertical and horizontal directions and dependence on frequency without reducing the resistance of its transparent conductive layer serving as electrode.

The above and other objects of the present invention are achieved by providing a liquid crystal display device with transparent conductive layers on its first and second substrates having different surface resistance values, depending on the widths and lengths of these substrates.

BRIEF DESCRIPTION OF THE DRAWINGS

The accompanying drawings, which are incorporated in and form a part of the specification, illustrate embodiments of the present invention and, together with the description, serve to explain the principles of the invention.

DETAILED DESCRIPTION OF THE INVENTION

Figure 1A:
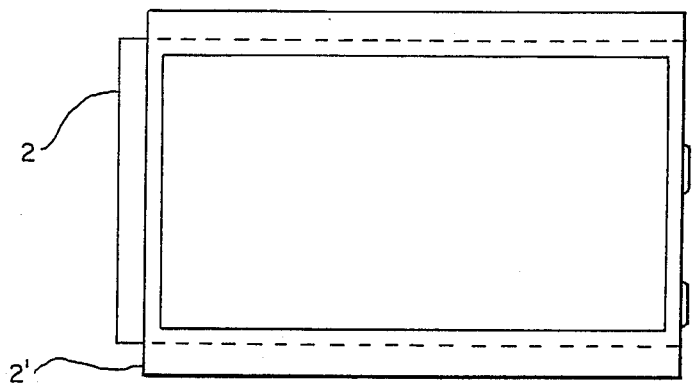
FIGS. 1A–1D show the structure of a liquid crystal display device embodying the present invention, FIGS. 1A–1C being plan views of both substrates, its common electrode substrate and its segment electrode substrate, respectively, and FIG. 1D being its sectional view.
Figure 1B:
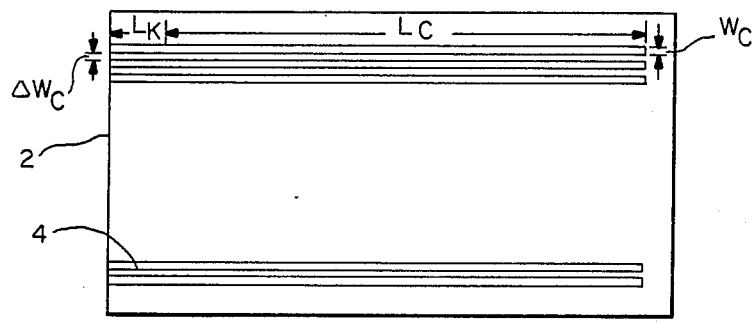
Figure 1C:
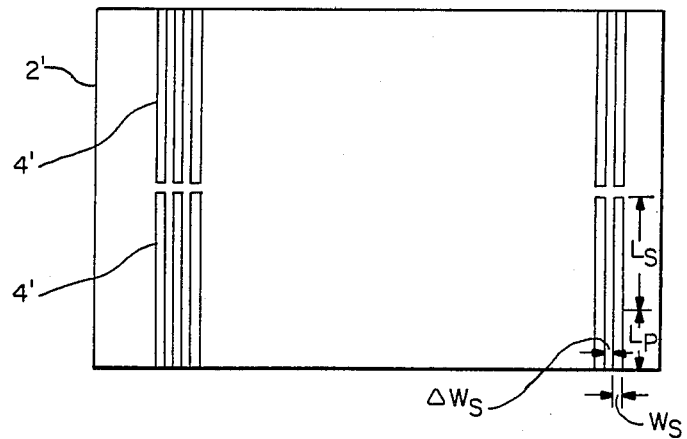
Figure 1D:
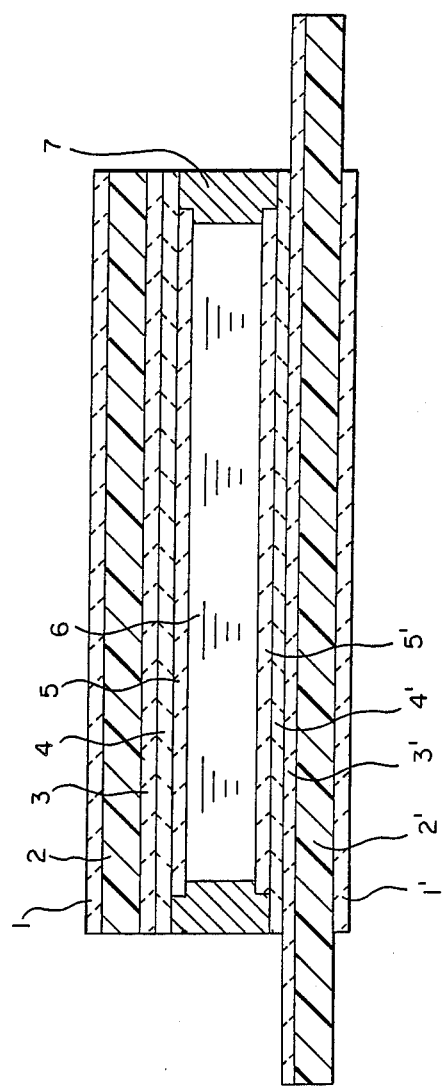

The structure of a liquid crystal display device (or panel) of a dot matrix electrode structure embodying the present invention is explained below by way of FIGS. 1A–1D. As shown in FIG. 1D which is its sectional view, a pair of transparent substrates (first and second transparent substrates) 2 and 2' are sandwichingly disposed on both sides of a liquid crystal 6 and bonded thereto by a sealing agent 7 to seal the liquid crystal 6 inside. On the surfaces of the first and second substrates 2 and 2' facing the liquid crystal 6 are orientation layers 5 and 5' belt-like mutually parallel transparent electrodes 4 and 4' and insulating layers 3 and 3', respectively. On the externally facing surfaces of the first and second substrates 2 and 2' distal from the liquid crystal 6 are polarization plates and 1 respectively. The transparent electrodes 4 and 4' respectively on the first and second transparent substrates 2 and 2' are hereinafter referred to respectively as the first transparent electrodes and the second transparent electrodes. The first and second transparent electrodes 4 and 4' are sometimes also referred to as common electrodes and segment electrodes. The first and second transparent substrates 2 and 2' are likewise sometimes referred to as common substrate and segment substrate. The first and second transparent electrodes 4 and 4' are so disposed across the liquid crystal 6 as to be perpendicular to each other such that if there are M first transparent electrodes and N second transparent electrodes, there are altogether MN crossing points, serving as MN pixels. FIG. 1A is a plan view of the liquid crystal display device. FIG. 1B is a plan view of the first substrate 2 showing the distribution of the first transparent electrodes 4 thereon. FIG. 1C is a plan view of the second substrate 2' showing the distribution of the second transparent electrodes 4' thereon. These transparent electrodes are formed by making a transparent dielectric film into a belt-like elongated shape. The transparent substrates 2 and 2' may be glass and solid or plastic and flexible.

The device embodying the present invention and shown in FIGS. 1A-1D is characterized generally as having transparent conductive layers of different surface common) electrodes. More particularly, if the lengths and widths of the segment electrodes are $L_S$ and $W_S$, respectively, and those of the common electrodes are $L_C$ and $W_C$, respectively, the ratio of the surface resistance of the segment electrode $R_S$ and that of the common electrode $R_C$ is given by $R_S/R_C=L_CW_S/L_SW_C$ 50%. Accordingly, transparent conductive layers of low resistance are used for common electrodes which are generally long and those of relatively high resistance are used for segment electrodes.

If the surface resistance values $R_S$ and $R_C$ for segment and common electrodes are selected as explained above, a matrix liquid crystal display of an arbitrary shape acquires the properties of a square matrix from the point of view of resistance. This is because to shorten the length of a line-shaped conductive film to one-half and to reduce its surface resistance to one-half are equivalent to each other in that the impedance between its end points becomes one-half. In other words, to set $R_S$ and $R_C$ as above is equivalent to converting the given matrix liquid crystal display into a square shape.

Next, if two matrix liquid crystal displays having the same area are compared, one being a square and the other being an elongated rectangle, it can be imagined, even from a qualitative consideration alone, that the fluctuations in the threshold voltage $V_{th}$ would be smaller with the square matrix. In fact, as will be explained more fully below, simulation experiments also show that the square one is more advantageous. Thus, it is possible to reduce both the fluctuations in $V_{th}$ and the dependence on frequency by properly setting $R_S$ and $R_C$ with respect to each other and to thereby improve the quality of large matrix displays and liquid crystal televisions by using inexpensive layers although the resistance of the transparent conductive layers is not reduced as a whole.

A large dot matrix liquid crystal display panel embodying the present invention is shown in FIG. 1A with its common electrode substrate 2 and segment electrode substrate 2', respectively shown in FIGS. 1B and 1C. The line widths $W_C$ and $W_S$ of the common and segment electrodes 4 and 4', are both about 0.33 mm (that is, the pixels are all square). Thus, the surface resistance values $R_C$ and $R_S$ are determined only by the line lengths $L_C$ and $L_S$ of the common and segment electrodes 4 and 4'.

Figure 2:
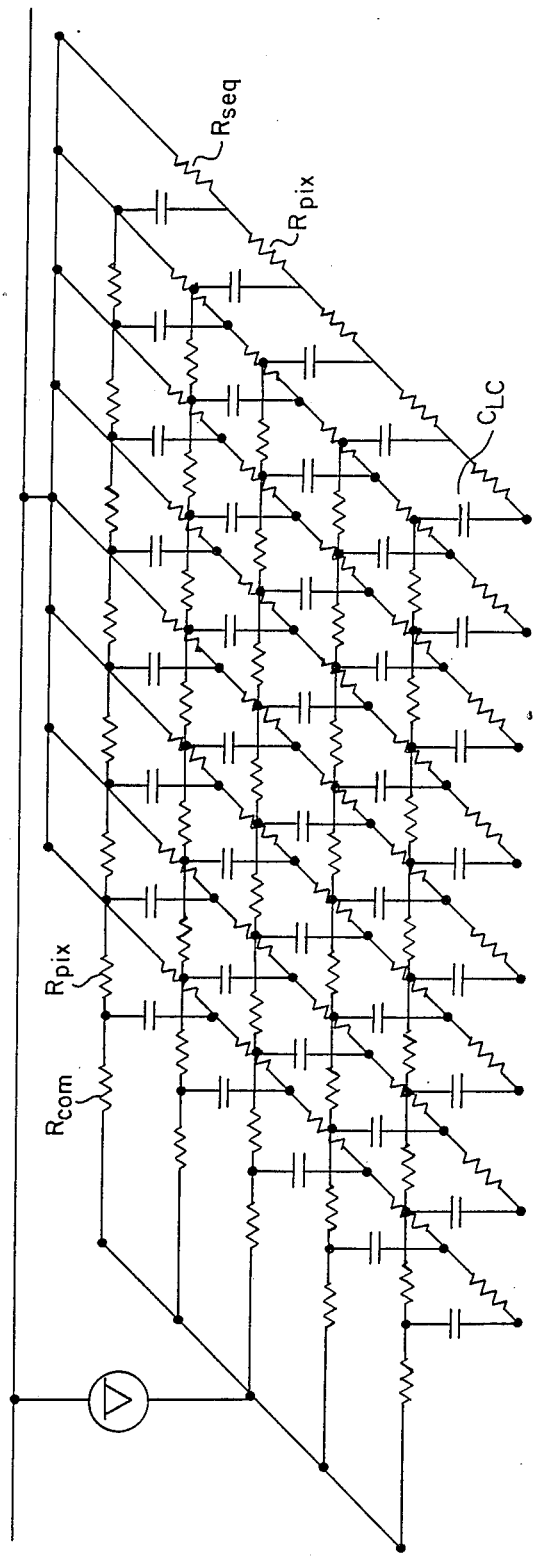
FIG. 2 is a diagram of an equivalent circuit.

FIG. 2 is a model equivalent circuit of an ordinary matrix liquid crystal display when all its lines are switched on. For the purpose of making the simulation easier, electrical effects of orientation layers 5 and 5' are ignored and the DC resistance of liquid crystals is assumed infinitely large. As can be understood from this equivalent circuit diagram and will be explained more fully below, each pixel has a different impedance because the liquid crystal of each pixel has $R_{pix}$ defined above and $C_{LC}$ (capacitance of the liquid crystal) in series and parallel. The effective voltage V(m,n) and the threshold voltage $V_{th}$ (m,n) of the pixel at segment line number m and common line number n when a voltage of V is applied are given by Equations (1) and (2) as follows:

$$V(m,n)=f(m,n)V \quad \text{Eq.} \quad (1)$$

$$V_{th}(m,n)=V_{th}/f(m,n) \quad \text{Eq. (2)}$$

where $$f(m,n) = (((g(m,n,1))^2 + (g(m,n,3)/3)^2 + (g(m,n,5)/5)^2 + \ldots)/(1 + (1/3)^2 + (1/5)^2 + \ldots))^{1/2},$$

$$g(m,n,x) = k(m,n,x)/(1 - (j/5P))\left(R_{seg}\sum^{n} k(m,n,x) + R_{com}\sum^{m} k(m,n,x)\right),$$

$$k(m,n,x) = \delta(A)(A)^{-1}P,$$
$$P = 1/(2\pi f j C_{LC}),$$

Figure 3:
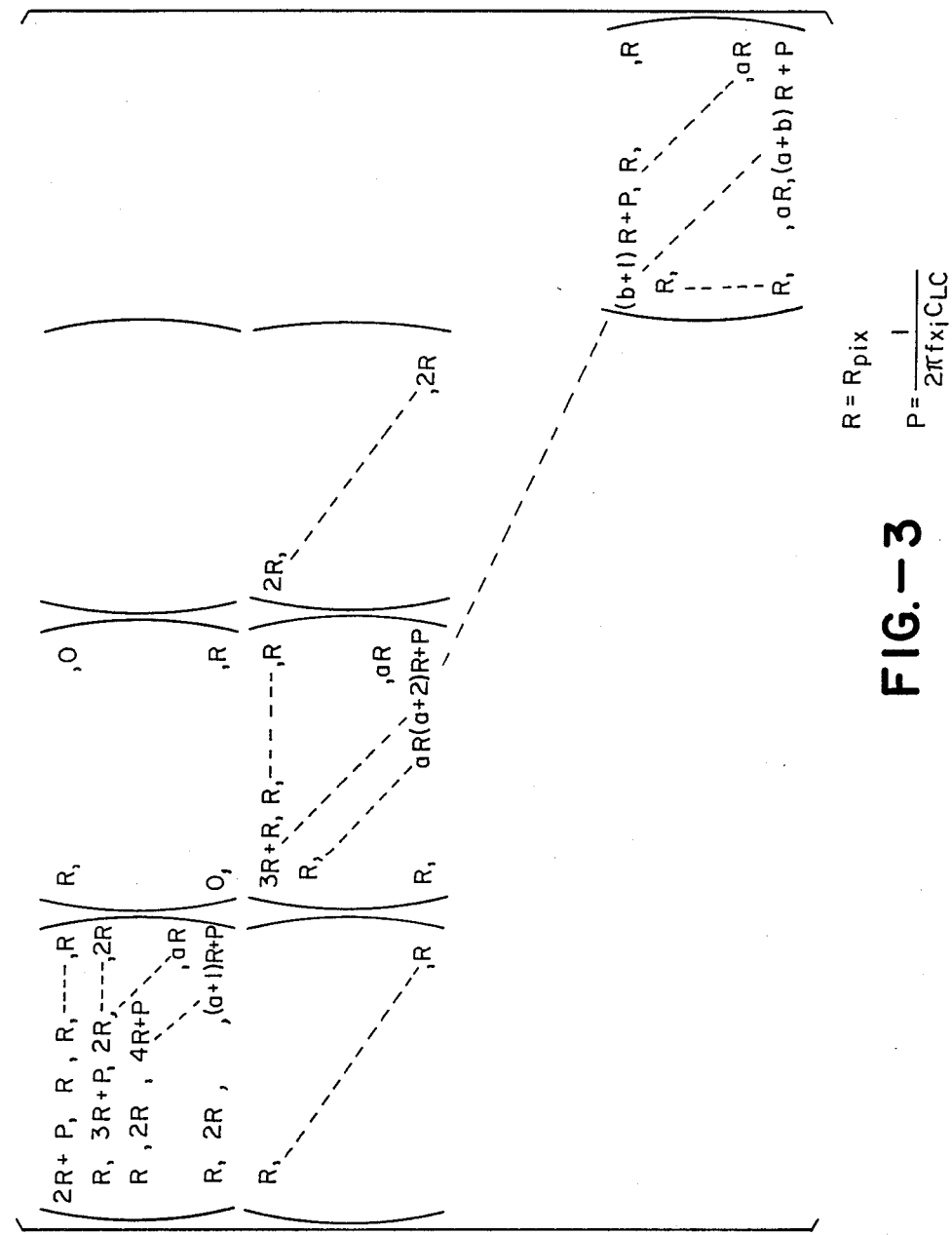
FIG. 3 is a matrix used for a simulation calculation.

(A) is a $(a \times b)^2$ square matrix shown in FIG. 3 when the number of pixels on the segment side and that on the common side are a $\delta(A)$ represents the sub-determinant obtainable by removing the mth column and the nth row of (A) and b, respectively, and $V_{th}$ is the original threshold voltage when f is about 100 Hz.

Let us apply the equations above to a display device having 640 segment electrode lines and 400 common electrode lines. In FIGS. 1A-1C, since the segment lines are cut at the center of the panel this means a=640 and b=200. If the threshold voltage $V_{th}$ is $V_{th}$ (1,1 kHz) when m 1, n =200 and f= 1 kHz, $V_{th}$ (640,1 kHz) when m =640, n =200 and f =1 kHz and $V_{th}$ (640,4 kHz) when m =640, n =200 and f =4 kHz, and if we define $\Delta V_{th} = V_{th}$ (640,1 kHz)$-V_{th}$ (1,1 kHz) and $\Delta F=V_{th}$ (640,4 kHz)$-V_{th}$ (640,1 kHz), their calculated values are as shown in Table 1 where $V_{th}$ (f =200 Hz)=2.0 $V_{rms}$, $C_{pix}$ $1.1\times10^{-12}$F, and 110 pixels are assumed to be aligned at the terminal. The calculations for Table 1 employ 50 Fourier terms.

Table 1 shows that both $\Delta V_{th}$ and $\Delta f$ become small when $R_S$ is greater than $R_C$ and, in particular, that they reach their minimum values when the ratio $R_S/R_C$ is about 3.2. Since the ratio of the numbers of the pixels is 640/200=3.2 (corresponding to $L_C/L_S$ because they are square pixels as mentioned above), this corresponds to the ratio between $R_S$ and $R_C$ of which variations are small. This means that the linear resistance of the common electrode 640$R_C$ is equal to that of the segment electrode 200$R_S$. In the above example, the separations $\Delta W_C$ and $\Delta W_S$ between dots are about 0.03 mm, indicating that the pitches are very fine and this magnitude may be considered to be within the range of fluctuations.

TABLE 1

| $R_C(\Omega)$ | $R_S(\Omega)$ | $V_{th}(640,1 \text{ kHz}) - V_{th}(1,1 \text{ kHz}) = \Delta V_{th}(V)$ | $\Delta F(V)$ |
|---|---|---|---|
| 10 | 10 | 2.54 − 2.37 = 0.017 | 0.037 V |
| 10 | 20 | 2.047 − 2.039 = 0.008 | 0.033 |
| 10 | 30 | 2.047 − 2.041 = 0.006 | 0.032 |
| 10 | 40 | 2.050 − 2.043 = 0.007 | 0.034 |
| 10 | 50 | 2.053 − 2.045 = 0.008 | 0.037 |
| 10 | 32 | 2.047 − 2.041 = 0.006 | 0.032 |

In summary, the above indicates that $L_C R_C$ should be approximately equal to $L_S R_S$ in order to reduce $\Delta V_{th}$ and $\Delta F$. When the line widths $W_C$ and $W_S$ are not equal, the above condition translates to $L_C R_C W_C$ being approximately equal to $L_S R_S / W_S$. Since the quotient $L_C R_C / W_C$ corresponds to the impedance from one end to the other, it may be stated as the desired condition that the impedance between the ends of the common electrodes be equal to that of the segment electrodes.

Figure 4:
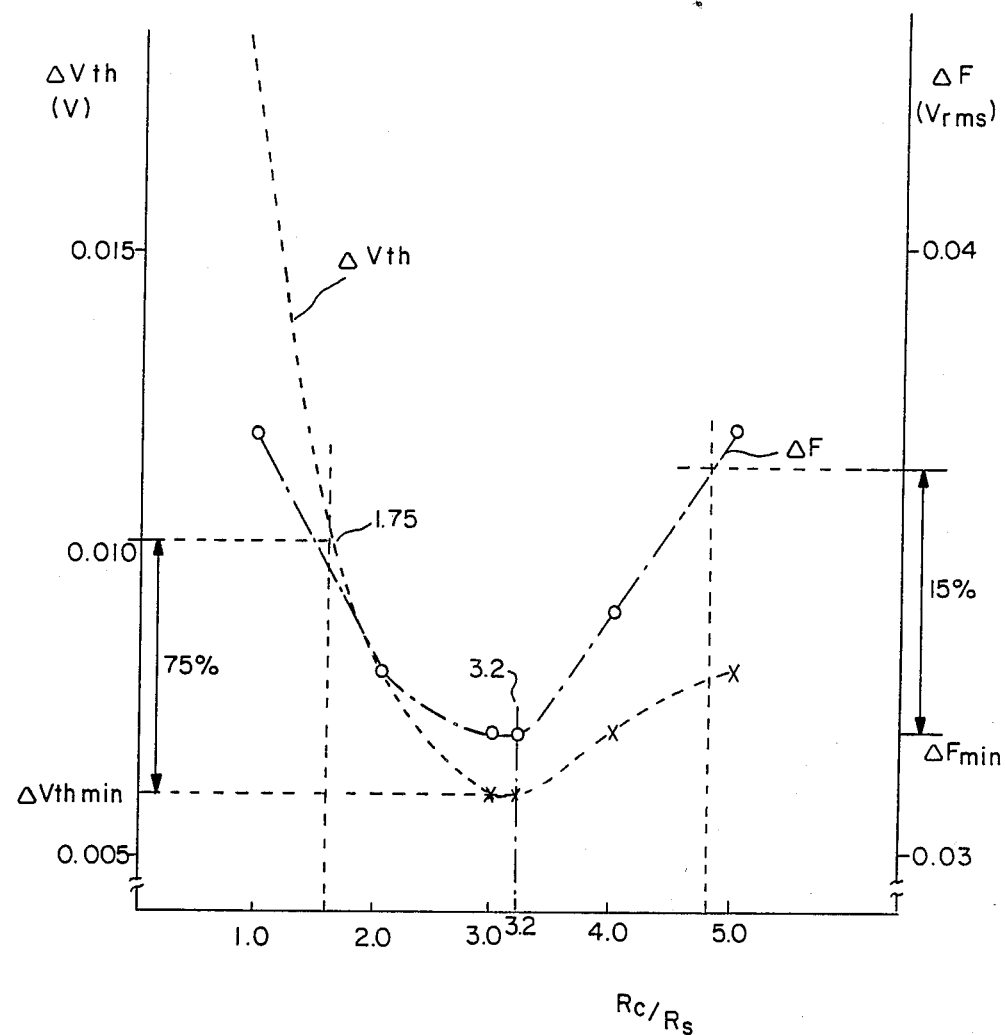
FIG. 4 is a graph of characteristic curves.

Although it is desired that the ratio $R_S/R_C$ be equal to $L_C W_S / L_S W_C$, a deviation of up to 50% in either direction is allowed in practical applications in view of the fluctuations in the thickness and quality of the transparent conductive layer and still a better result is obtained than if $R_S$ and $R_C$ are set equal to each other. As an example, FIG. 4 shows that a deviation from $R_S/R_C$ 3.2 by up to 50% ($R_S/R_C = 1.6-4.8$) is allowed if $\Delta V_{th}$ is allowed to be up to 75% above its minimum and $\Delta F$ is allowed to be up to 15% above its minimum.

Figure 5A:
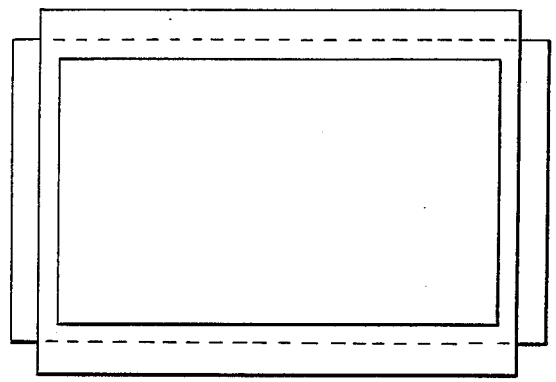
FIGS. 5A–5C are plan views of another liquid crystal display device embodying the present invention, its common electrode substrate and its segment electrode substrate.
Figure 5B:
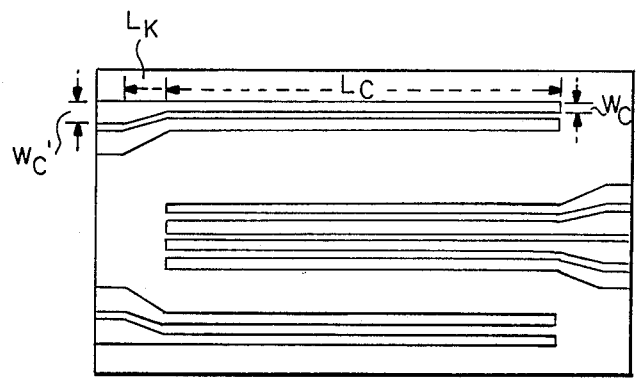
Figure 5C:
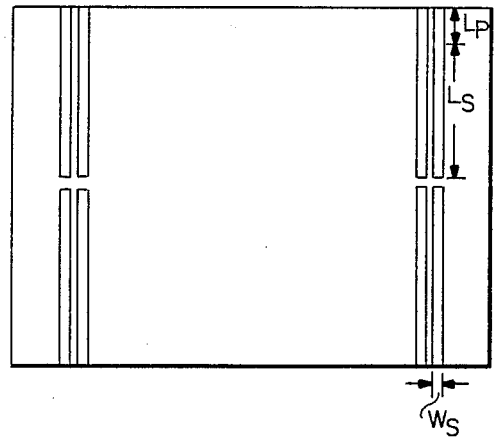

FIGS. 5A–5C show another liquid crystal display element embodying the present invention characterized as having the common electrodes widened (to $W_C'$) near the terminal such that the voltage drop by the resistance at the terminal section (of length $L_k$) can be somewhat reduced. Other advantages of this embodiment include preventing line breakage, reduction of contact resistance with the flexible substrate and increasing adhesiveness. In FIG. 5C, $L_p$ indicates the length of the terminal section of the segment electrodes.

In summary, the present invention serves to improve the display quality of a multi-pixel display by a large matrix liquid crystal display or a liquid crystal television by reducing the fluctuations in threshold voltage and dependence on frequency to obtain uniform displays without increasing the cost or reducing transmissivity or adhesiveness of the layers.

What is claimed is:

1. A liquid crystal display device having dot matrix electrodes comprising
   a liquid crystal layer,
   a plurality of mutually parallel elongated transparent belt-like first electrodes of length $L_1$ and width $W_1$, and
   a plurality of mutually parallel elongated transparent belt-like second electrodes of length $L_2$ and width $W_2$, said first and second electrodes sandwiching said liquid crystal layer therebetween and crossing each other to form a lattice across said liquid crystal layer, said first and second electrodes having surface resistance $R_1$ and $R_2$, respectively, and the ratio $R_1/R_2$ being within 50% of $L_2 W_1 / L_1 W_2$.

* * * * *